United States Patent
McKervey

(10) Patent No.: US 12,535,725 B2
(45) Date of Patent: Jan. 27, 2026

(54) IMAGE PROJECTOR

(71) Applicant: Canyon Product Development, LLC, Nashville, TN (US)

(72) Inventor: Michael Kevin McKervey, Nashville, TN (US)

(73) Assignee: Canyon Product Development, LLC, Nashville, TN (US)

( * ) Notice: Subject to any disclaimer, the term of this patent is extended or adjusted under 35 U.S.C. 154(b) by 517 days.

(21) Appl. No.: 18/079,678

(22) Filed: Dec. 12, 2022

(65) Prior Publication Data

US 2023/0185177 A1    Jun. 15, 2023

Related U.S. Application Data

(60) Provisional application No. 63/289,466, filed on Dec. 14, 2021.

(51) Int. Cl.
    *G03B 21/28*    (2006.01)
    *G03B 21/14*    (2006.01)

(52) U.S. Cl.
    CPC ........... *G03B 21/28* (2013.01); *G03B 21/142* (2013.01)

(58) Field of Classification Search
    CPC .. H04N 9/3129; H04N 9/3135; H04N 9/3152; H04N 9/3161; H04N 9/3164; G03B 21/10; G03B 21/12; G03B 21/13; G03B 21/28; G03B 21/142; G03B 21/145; G03B 21/2006; G03B 21/2013; G03B 21/2033; G03B 21/2053; G03B 21/2066
    See application file for complete search history.

(56) References Cited

U.S. PATENT DOCUMENTS

| | | | |
|---|---|---|---|
| 3,448,458 | A | 6/1969 | Carlson et al. |
| 4,241,343 | A | 12/1980 | Fan et al. |
| 6,175,440 | B1 | 1/2001 | Conemac |
| 9,557,630 | B1 | 1/2017 | Marason et al. |
| 10,694,158 | B2 | 6/2020 | McKervey |
| 2002/0180869 | A1 | 12/2002 | Callison et al. |
| 2005/0052720 | A1 | 3/2005 | Tetterington |
| 2005/0206847 | A1 | 9/2005 | Hansen et al. |
| 2008/0247020 | A1 | 10/2008 | Malyak et al. |

(Continued)

OTHER PUBLICATIONS

International Search Report and Written Opinion for International Application No. PCT/US2017/039709 mailed Sep. 13, 2017.

*Primary Examiner* — Sultan Chowdhury
(74) *Attorney, Agent, or Firm* — Finch & Maloney PLLC

(57) ABSTRACT

In an illustrative embodiment, methods and systems for image projection include a beam director having a surface region geometrically encoded with an image such that, when a beam profile created from a beam strikes a portion of the surface region of the beam director, an altered beam profile is created incident to the portion of the surface region, where the altered beam profile has a light beam pattern configured to present a portion of the image, and the altered beam profile includes a predetermined beam spacing, a predetermined beam size, and a predetermined beam shape. The beam director may be configured to redirect predetermined beam profiles including the altered beam profile, incident across portions of the surface region of the beam director, as image beam patterns configured to strike a projection surface where the image is displayed.

26 Claims, 11 Drawing Sheets

(56) References Cited

U.S. PATENT DOCUMENTS

| | | |
|---|---|---|
| 2010/0020377 A1 | 1/2010 | Borchers et al. |
| 2010/0141729 A1 | 6/2010 | Petsch et al. |
| 2010/0142021 A1 | 6/2010 | Malyak et al. |
| 2010/0277705 A1* | 11/2010 | Gollier .................. G02B 27/48 |
| | | 353/121 |
| 2010/0296144 A1 | 11/2010 | Borchers et al. |
| 2011/0221847 A1 | 9/2011 | Takezawa |
| 2012/0032875 A1* | 2/2012 | Sprowl .................. G02B 27/01 |
| | | 353/98 |
| 2012/0086915 A1 | 4/2012 | Rosen et al. |
| 2013/0038736 A1 | 2/2013 | Yamamura |
| 2014/0187968 A1* | 7/2014 | Pinho .................. G01N 21/314 |
| | | 600/476 |
| 2015/0210084 A1 | 7/2015 | Ghauri |
| 2017/0192345 A1* | 7/2017 | Somashankarappa ....................... |
| | | G03B 21/001 |
| 2018/0152697 A1 | 5/2018 | DeVaul et al. |
| 2018/0176473 A1 | 6/2018 | Wipperman et al. |
| 2019/0007661 A1 | 1/2019 | McKervey |

\* cited by examiner

IMAGE PROJECTOR

RELATED APPLICATIONS

This application claims priority to U.S. Provisional Patent Application Ser. No. 63/289,466, entitled "Laser Based Image Projector," filed Dec. 14, 2021.

This application is related to the following prior patent application: U.S. patent application Ser. No. 15/635,791, entitled "Image Projector," filed Jun. 28, 2017 (now U.S. Pat. No. 10,694,158). Each of the above identified applications is hereby incorporated by reference in its entirety.

BACKGROUND

During certain hazards, or in certain locations, it can be beneficial to project information about exits, emergency stations, or any other similar information onto the ground or other visible surfaces where it would not be desirable to present such information in a permanent fashion, such as via paint or permanently erected signs. One solution to this is to utilize a projection system to project the pertinent information or iconography on the desired surface only at the appropriate times.

Complex laser imaging systems, such as those utilized in projectors, include multiple complex mirrors, each of which is required to move in synchronization with each of the others mirrors in order to generate a desired image. Laser imaging systems typically include complex and delicate electronic and mechanical controls that control the synchronization of the mirrors. As a result of the significant number of colors and lasers utilized, as well as the delicate electronics within a projector, continued, uninterrupted, operation of the projector under hazard conditions, such as those that would be present in the case of a fire, flood, exposure to the elements, forces from transportation, or any similar hazard, is unreliable or impossible. The complex systems, and systems with a computer directing the beam paths, also may have more opportunity for malfunctions to direct a beam in an unintended manner, creating a hazard.

SUMMARY OF ILLUSTRATIVE EMBODIMENTS

The inventor recognized the need for a simple, low budget, durable projection solution for presenting an image, including letters, shapes, and/or other designs, to relay a message to passersby, drivers, or other people in an area. The image, in some illustrative examples, can include a word, phrase, sentence, traffic symbol, safety symbol, navigational symbol, logo, mascot, graphical icon such as an emoticon, or other shape used to relay meaning to a viewer.

In one aspect, the present disclosure relates to projecting information by physically encoding at least one image into the surface geometry of a beam director (e.g., facets, openings, convex surfaces, concave surfaces, continuous 3D surfaces, non-continuous 3D surfaces, scattering surfaces, absorbing surfaces, reflective surfaces, diffractive surfaces, reflective surfaces, and similar elements). The image encoded into the beam director may be conveyed by directing at least one beam profile at the surface geometry of the beam director. A beam profile refers to a particular beam pattern, including beam spacing, beam size, and beam shape. The beam profile does not contain the image. The beam profile is incident across the beam director in one or more areas. The beam director is designed to redirect one or more specific beam profiles on the one or more areas of the beam director from one or more specific vectors onto one or more projection surfaces where the at least one image is displayed.

In some embodiments, the beam profile is created by the beam source. A non-exclusive example of this is the commonly available rectangular laser beam. The rectangular profile strikes the beam director. The beam director's geometry is such that the specific beam profile at the specific vector creates an image on a projection surface.

In some embodiments, the beam profile is created by directing a light beam through a beam profiler. The beam profiler, for example, may include shaped openings, mirrors, lenses, diffraction gratings, or other optical elements. A non-exclusive example of this is a cylinder lens, used to generate a narrow rectangle. The rectangular profile strikes the beam director. The beam director's geometry is such that the specific beam profile at that vector creates an image on a projection surface.

In some embodiments, the beam profiler is movable in relation to the beam director to cause controlled redirection of the light beam(s) off of the beam director and onto a projection surface as the beam profile is swept across the beam director, where the redirected light repeatedly traces out the image at a refresh speed allowing human recognition of the encoded image. The refresh speed, in one example, may be configured such that, to the human eye, the entire image is displayed at once. In another example, the refresh speed may be configured such that portions of the image are interpretable by the human eye at different times. For example, a first character or set of characters of a message may appear to be visible prior to other characters of the message. In another example the image may have gaps in the border which could be moving or stationary.

In some embodiments, the beam profile sweeps across multiple locations on the beam director to create multiple or moving images.

In one aspect, methods and systems of projecting an image include emitting a beam profile onto a beam director and redirecting the beam onto a projection surface using the beam director such that the beam forms the at least one image on the at least one projection surface. The beam director may include at least one image encoded onto the beam director.

In some embodiments, a beam profiler is used to create the beam profile. The beam profiler may project the beam profile onto the beam director for redirection to the at least one projection surface. The beam profiler may be an element which changes the profile of the beam projected on the beam director. The beam profiler may be a reflector. A beam may be incident on the beam profiler, which projects a beam profile onto the beam director. The beam profiler may be a refractor. A beam may be incident on the beam profiler, which projects a beam profile onto the beam director. The beam profiler may be a diffractor. A beam may be incident on the beam profiler, which projects a beam profile onto the beam director. The beam profiler may be articulating. A beam may be incident on the beam profiler, which when articulated traces a beam profile on to the beam director. Moving the beam profiler relative to the beam source may include rotating the beam profiler about an axis.

In some embodiments, the at least one image is encoded on the beam director via a shape and dimensions of at least one surface of the beam director.

In some embodiments, a redirection angle of the altered beam is dependent on a specific angle in three-dimensional space of an incident surface of the beam director, a location of the beam profile relative to the beam director, and a point of incidence of the beam profile on the beam director.

Moving the beam profiler relative to the beam source may include moving the beam profiler linearly.

In some embodiments, the beam director includes an array of angled faces and locations where the beam profile is incident upon the beam director passes through the array of angled faces. A location of the beam on the projection surface may be at least partially controlled by an angle of a face of the beam director that the beam profile is incident upon relative to the beam.

In some embodiments, the beam source is continuously on as the at least one image is projected.

In some embodiments, the beam source is cycled between an on state and an off state as the at least one image is projected. The beam source, for example, may be cycled between an on state and an off state as the at least one image is traced.

In some embodiments, movement of the beam profiler is cyclical. Movement of the beam profiler may undergo at least 24 cycles per second.

In some embodiments, moving the beam profiler includes at least one of rotating the beam profiler about an axis or moving the beam profiler linearly.

In one aspect, an imaging device includes a beam source configured to produce a beam profile, and at least one beam director including at least one encoded image, where the beam profile is incident upon a surface of the at least one beam director, and the beam is redirected by the at least one beam director onto a projection surface, such that the beam projects the at least one encoded image on a projection surface.

In some embodiments, a beam profiler is used to create the beam profile. The beam profiler may project the beam profile on the beam director for redirection to the at least one projection surface. The beam profiler may be an element which changes the profile of the beam to project a beam profile on the beam director. The beam profiler may be an articulating. A beam may be incident on the beam profiler, which when articulated traces a beam profile on to the beam director. The beam profiler actuator may be a rotary actuator.

In some embodiments, the at least one encoded image is encoded on the at least one beam director via a shape and dimension of the surface of the at least one beam director.

In some embodiments, the at least one surface of the at least one beam director includes a multitude of faces.

In some embodiments, the beam profiler actuator is a linear actuator, and the at least one beam director includes a clear structure having an incident surface and a refraction surface, where each of the refraction surface and the incident surface are at varied angles relative to the beam.

In some embodiments, the surface of the at least one beam director includes at least one of a non-reflective surface and a diffusive surface.

In some embodiments, the imaging device includes at least one component disposed in a path of the beam after the beam is redirected by the at least one beam director and configured to alter the path of the beam, where the component includes at least one of a mirror and a lens, and where the component is configured to be articulated relative to the beam director.

In some embodiments, the imaging device includes at least one component disposed in a path of the beam after the beam source and before the projection surface, where the component includes at least one of a mirror and a lens, and where the component is configured to be articulated relative to the beam director. The imaging device may include at least one component disposed in a path of the at least one of beam, beam profile, and redirected beam, where the component includes at least one of a mirror and a lens which modifies the at least one of direction, size, keystone and orientation of the beam, beam profile or redirected beam.

In some embodiments, the beam profile and beam director are configured to move relative to each other. This can be through an articulated reflector, refractor, or diffractor disposed in a position between the beam source and projection surface. As the beam profile is incident on different parts of the beam director, the image on the projection surface changes.

In some embodiments, the beam profile and beam director are configured to move relative to each other. This can be through an articulated or multiple beam sources and beam directors. As the beam profiles are incident on different parts of the beam director or different beam directors, the image on the projection surface changes.

The foregoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1A:
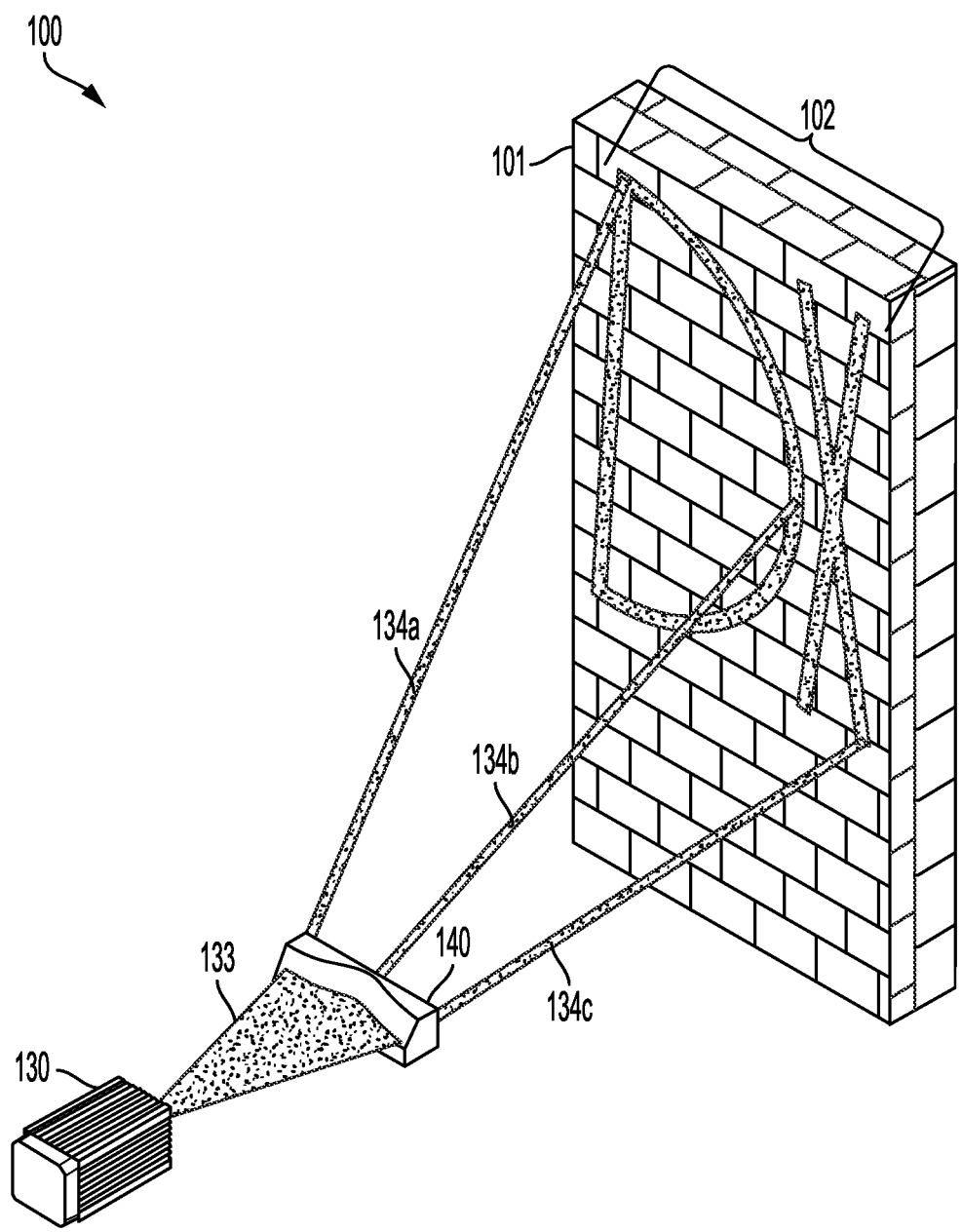
FIG. 1A schematically illustrates a first example imaging system.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized, or implemented in connection with the alternative embodiment unless the feature or function is incompatible with the alternative embodiment.

FIG. 1A schematically illustrates an example imaging system 100 designed and configured to display an image 102 (e.g., "DX" as displayed) on a projection surface 101 utilizing a beam director 140. The projection surface 101, in some examples, may be a wall, a floor, a billboard, a hillside, or the forest floor. The beam director 140 alters the path of a beam profile 133, producing an altered beam path 134 (e.g., illustrated as being broken into multiple sub-paths 134a-134c). The beam director 140 may alter the path, in some examples, through reflection, refraction, diffraction or a combination of reflection, refraction, diffraction, scattering, and absorption, depending on the type of beam director 140 utilized. The beam director 140 may alter the path to produce a single altered path or any number of alternate sub-paths 134. Further, the initial beam profile 133, in some embodiments, may include two or more sub-paths. The imaging system 100 includes a beam source 130, such as a laser beam, configured to produce the beam profile 133. To create a stationary image, the beam source 130 and beam director 140 may be maintained in a stationary position.

Figure 1B:
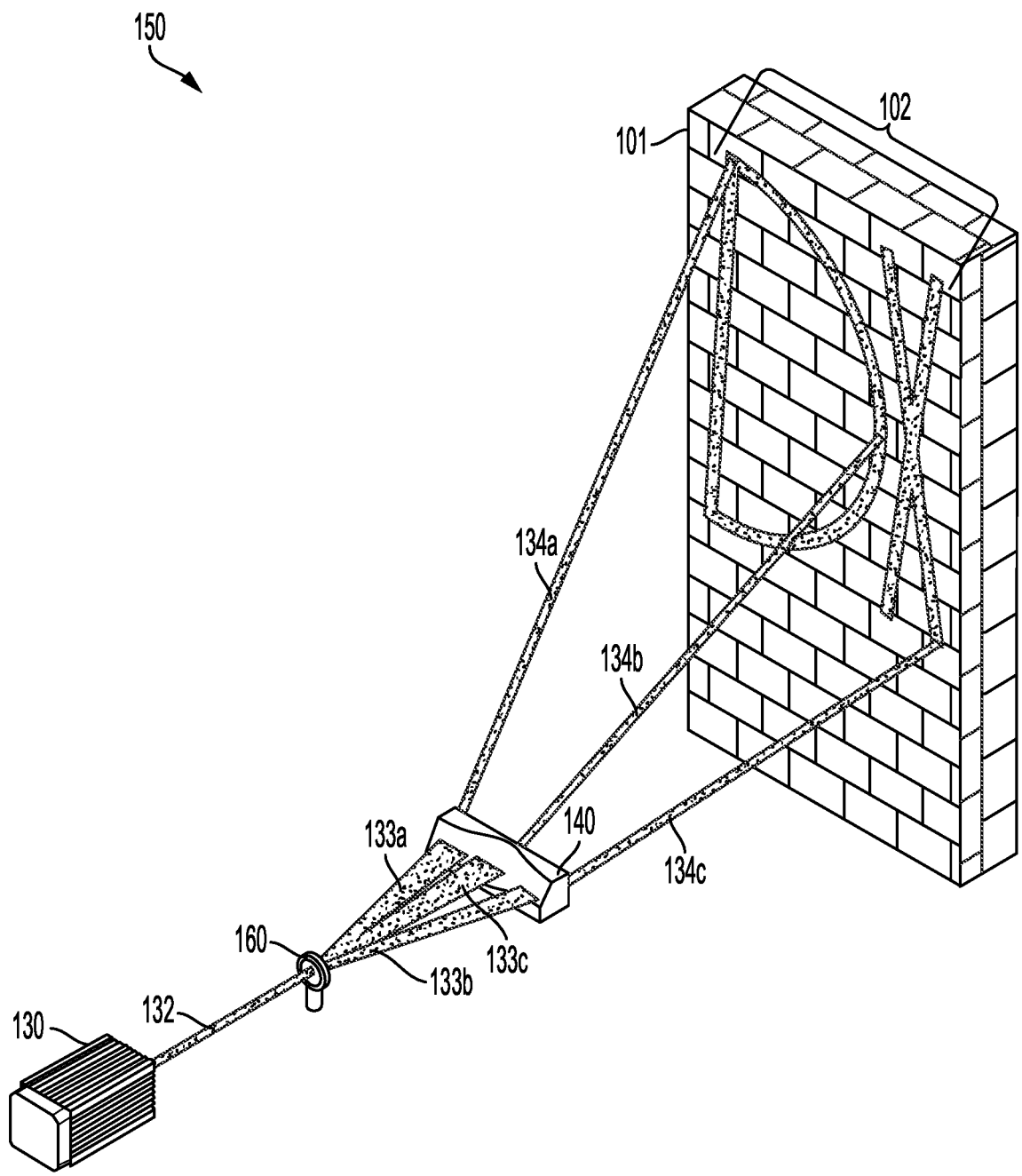
FIG. 1B schematically illustrates a second example exemplary imaging system.

Similarly, FIG. 1B schematically illustrates an imaging system 150 configured to utilize a beam profiler 160. The imaging system 150 includes a beam source 130 that generates a beam 132, such as a laser beam. To create a stationary image the beam source 130 is maintained in a stationary position, and the beam 132 is emitted along a constant beam path incident on beam profiler 160. The beam profiler 160 modifies the beam into a beam profile 133 using any combination of diffraction, refraction, reflection, scattering and absorption, that is redirected by the beam director 140 on to projection surface 101. As illustrated, the beam profile 133 includes three sub-profiles 133a-c. In other embodiments, any number of sub-profiles may be created by the beam profiler 160.

As the beam profile 133 is redirected by the beam director 140, the altered beam path 134 is created, which when incident upon the projection surface 101 creates at least one image 102.

Figure 2A:
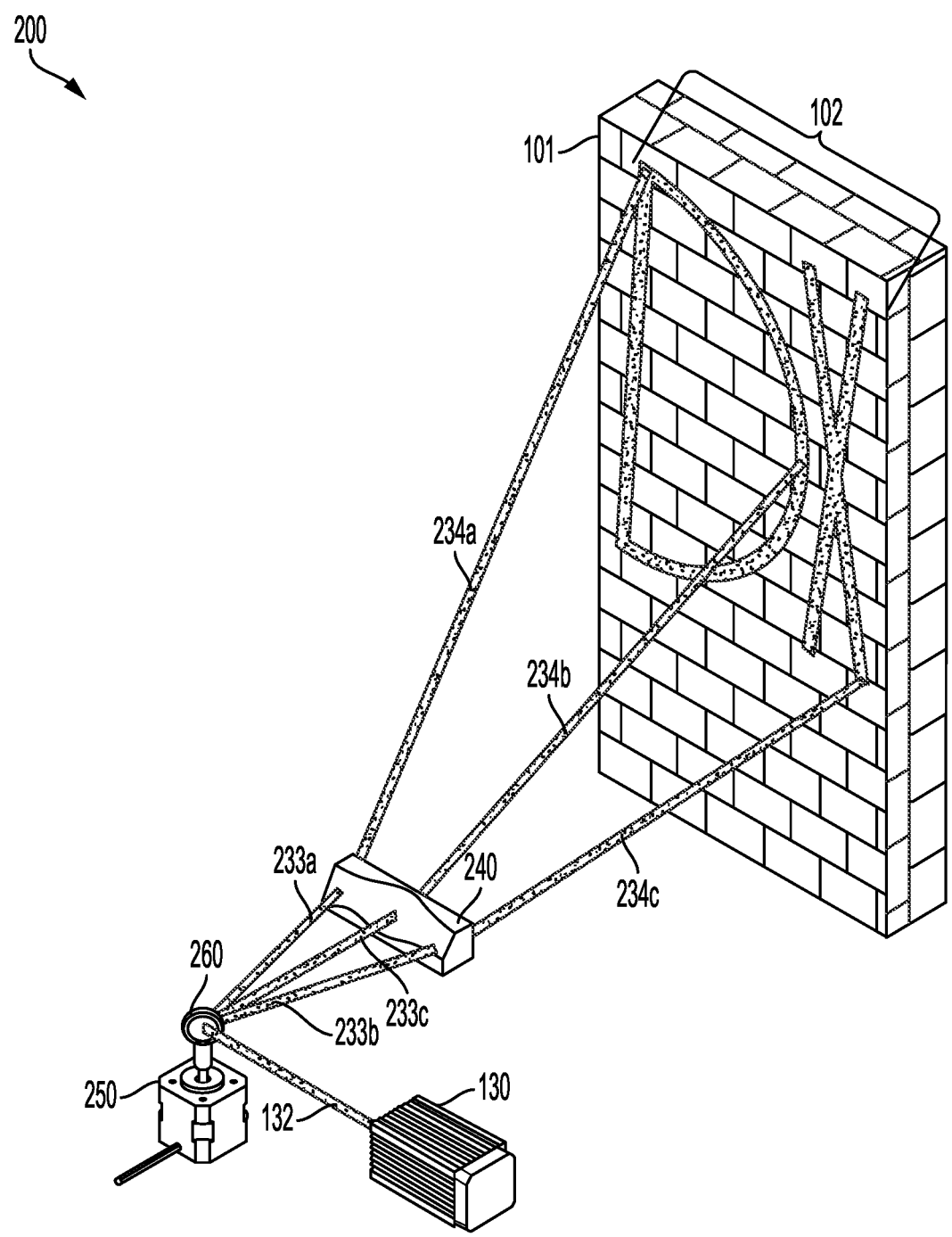
FIG. 2A schematically illustrates a third example imaging system.

FIG. 2A schematically illustrates the imaging system 200 configured to utilize a refractive articulating beam profiler 260 and refractive beam director 240. The beam 132 is incident on the beam profiler 260. An actuation device 250 (referred to as an actuator), such as a linear or rotary actuator, actuates the beam profiler 260, causing the beam profiler 260 to move relative to the beam 132. By way of non-exclusive example, the relative movement can be a rotation of the beam profiler 260 about an axis, a linear movement of the beam profiler 260, or a combination of the two. The movement of the beam profiler 260 determines the angle that a beam profile 233 is altered by controlling the position or positions that the beam profile 233 is incident on the beam director 240, as illustrated via multiple altered beam paths 234a-c.

Figure 2B:
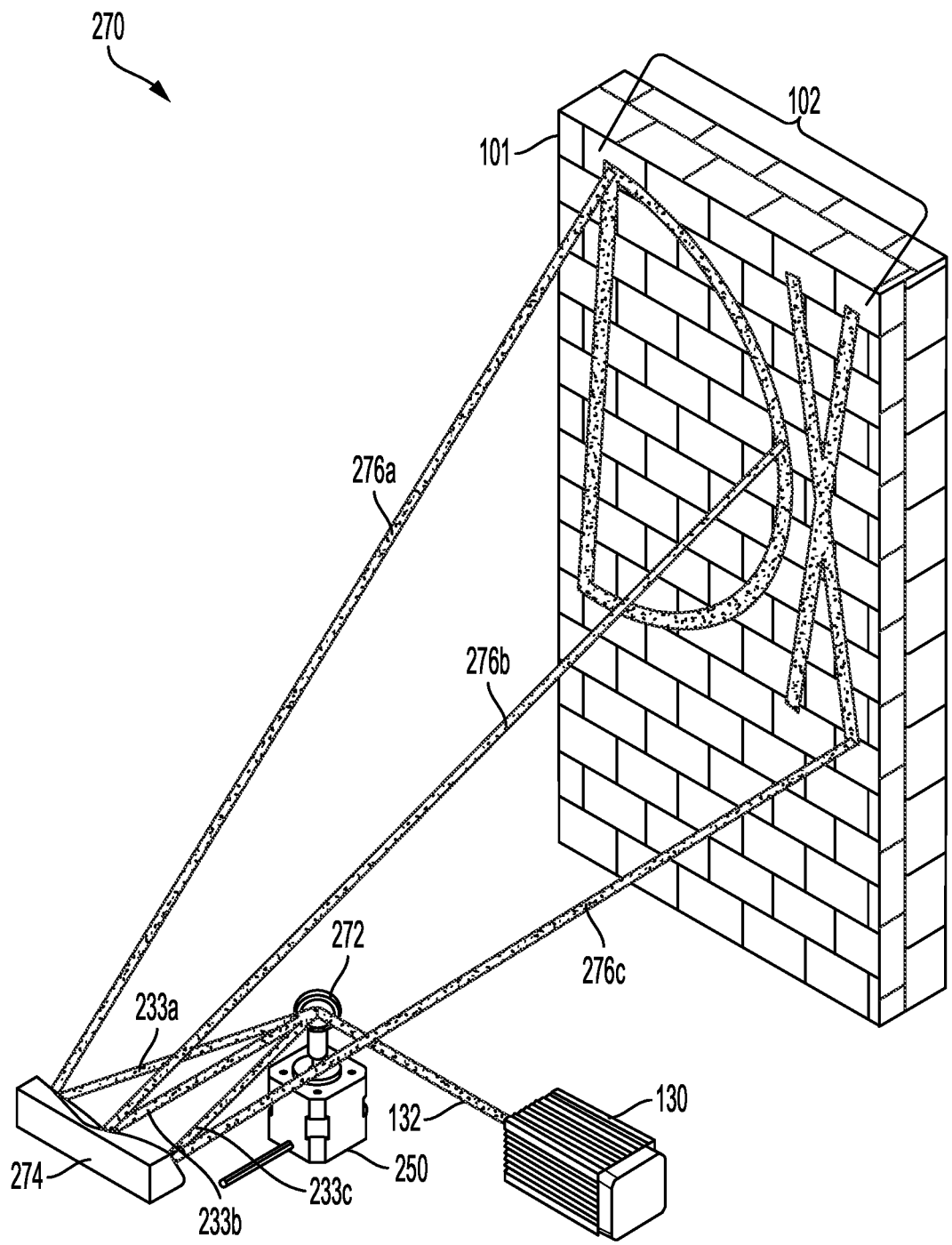
FIG. 2B schematically illustrates a fourth example imaging system.

Similarly, FIG. 2B schematically illustrates an example imaging system 270 configured to utilize a reflective articulating beam profiler 272 and reflective beam director 274. As an altered beam path 276 moves, the point at which the beam contacts the projection surface 101, and thus the point at which the beam is visible, moves along the projection surface 101. By actuating the beam profiler 272 in cycles, a cohesive image, or multiple distinct images, can be drawn (via tracing) on the projection surface 101. While described herein in singular form, it should be understood that the projection surface 101 can be a single surface, multiple adjacent surfaces, multiple discontinuous surfaces, or any other surface configuration. Further, by cycling the beam profiler 272 faster than the visual recognition rate of a human being, a single shape, or image, is projected onto the projection surface 101. In such an example, the image 102 is traced by the incident light of the altered beam path 276 on the projection surface 101 and the beam profiler 272 is cycled at least 24 cycles per second. In alternative examples, such as those where it is desirable for a person to see the image 102 being traced on a surface, the beam profiler 272 is cycled with fewer cycles per second.

To control the redirection angle of the altered beam path 276, the beam director 274, in some embodiments, includes angled reflection or refraction surfaces (see FIGS. 3-5D), with the angle of the surface at the point of incidence between the beam profile 233 and the reflection or refraction surface of the beam director 274 at least partially determining the angle that the altered beam path 276 is redirected. By way of example, the angle at the point of incidence is determinative of the redirection of the altered beam path 134 in a reflective beam director such as the beam director 274, whereas the angle at the point of incidence in combination with the material selection, as well as a spacing between surfaces is determinative of the redirection of the altered beam path 276 with a refractive beam director.

In the system 270, the position and/or orientation of the beam profiler 272 is altered by the actuator 250, such as a linear actuator or rotary actuator. Alternatively, any similar means of achieving the position and/or orientation change can be utilized to the same effect. Correspondingly, the angle of the reflecting surface or refracting surfaces of the beam director 274, at the position where the beam 132 is incident on the beam director 274, changes along the reflection surface or refraction surfaces, resulting in the position of the altered beam path 276 incident upon the projection surface 101 tracing out an image encoded on the beam director 274 as the beam profiler 272 is actuated.

By utilizing one or more surfaces having multiple set angles at the point of incidence, the resultant image traced out on the projection surface is hard encoded into the beam director. In other words, the physical dimensions of the beam director encode the image that is projected. In some examples, imaging systems such as the example imaging systems 100, 200, and 270 can be designed with the ability to switch out the beam director for an alternate beam director, thereby allowing a user to change the projected image. In yet further examples, multiple beam directors can be included, and a secondary actuation system can be utilized to switch which beam director, or beam profiler, the beam profile, or beam is incident upon during any given operation. In yet further examples, multiple lasers, or other beam sources, and/or a redirection component can be utilized to alter an incident position on the beam director or beam profiler, thereby altering the encoded image that is displayed.

Further, by hard encoding the image on the beam director, relatively simple rotary or linear actuation, or any similar mechanical movement, can be utilized to generate the image, allowing the imaging system to operate without requiring complex controls. By way of example, if the imaging system is designed to project an arrow, or other directional icon, leading individuals to an exit during a fire or similar emergency, a simple rotary or linear actuation system, or a non-moving system can continue to function while a more complex electronic system requiring timed beam sources, multiple synchronized actuated mirrors, or switching between multiple beams and beam directors, would degrade, require maintenance, unintentionally project beams in areas that may be hazardous, or otherwise cease to operate due to the harsh environment.

Figure 3:
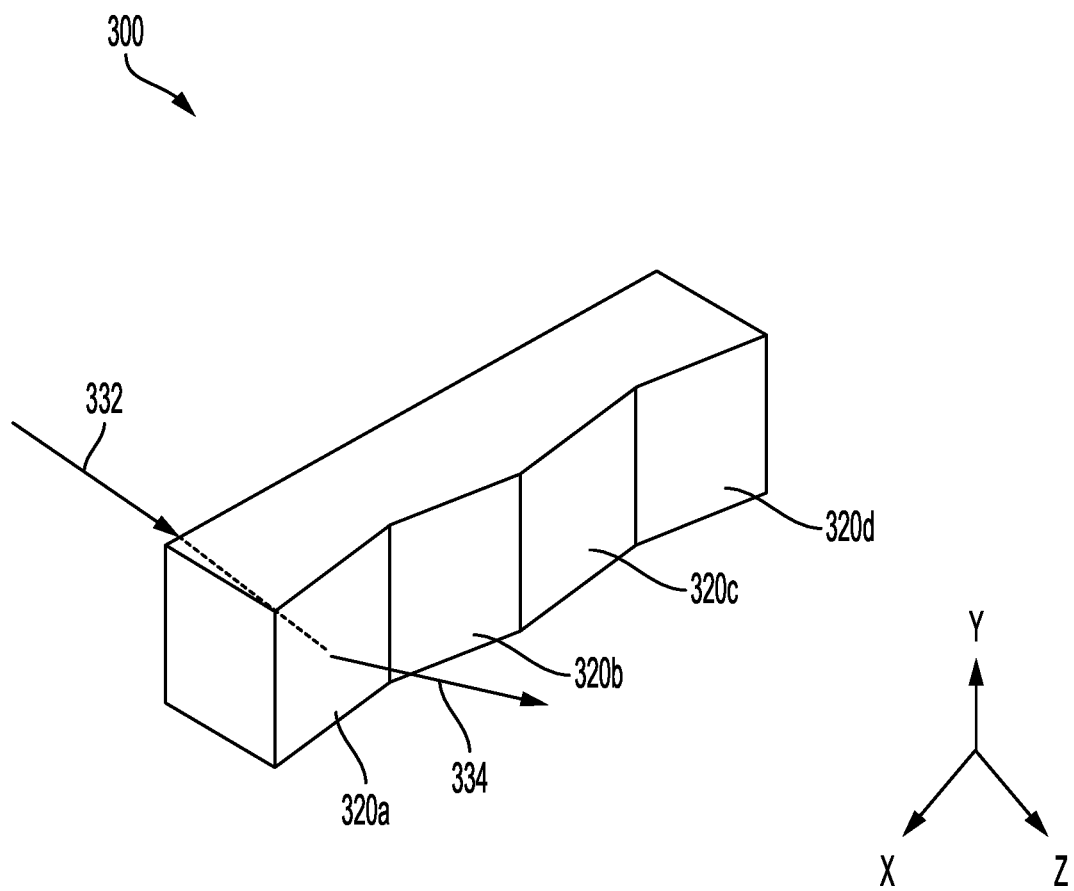
FIG. 3 schematically illustrates an example refractive beam director according to a first embodiment.

An example beam director 300 is illustrated in FIG. 3. The beam director 300 may be a clear structure, such as a prism, including one or more refractive surfaces 320. While illustrated as discrete refractive surfaces 320a-d arranged in a linear fashion, one of skill in the art having the benefit of this disclosure will understand that the refractive surfaces 320 can continuously shift from one angle to another angle, without being discrete surfaces via the utilization of a curved surface, or any similar feature. The angle of the refractive surface 320, relative to the beam profile 332, alters the beam path, creating an altered beam path 334 in the X-Y-Z coordinates, referred to moving forward as "three-dimensional space", causing the point of incidence of the altered beam path on the projection surface to shift. Further, while illustrated in the example beam director 300 as only including refractive surfaces 320a-d on one side of the beam director 300, it should be appreciated that the opposite side of the beam director 300 can also include refractive surfaces. In such an example it is the relative angle between the refractive surfaces that is determinative of the angle by which the altered beam path 334 is redirected.

With reference to FIGS. 1A and 1B, the entire beam profile 133 may be projected concurrently. The beam director 140 likewise may redirect the entirety of the beam profile concurrently into the entirety of the altered beam path 134. The altered beam path 134, for example, shifts in the three-dimensional space corresponding to the angle of the refractive surface of the beam path 134 (e.g., surfaces 320a-d of FIG. 3) or the relative angles of the refractive surfaces 320a-d. The utilization of multiple angled refractive surfaces 320, or a single refractive surface 320 where the instantaneous angle of the surface at the point of incidence of the beam profile 133 changes along the length, causes a shape to be projected on the projection surface 101.

In reference to FIGS. 2A and 2B, the beam profiler 260 is actuated by actuator 250, creating the beam profile 233. As the beam profile 233 is incident the beam director 240, the altered beam path 234 shifts in the three-dimensional space corresponding to the angle of the refractive surface of the beam director 240 (e.g., surface(s) 320 of FIG. 3), or the relative angles of the refractive surfaces 320. The utilization of multiple angled refractive surfaces 320, or a single refractive surface 320 where the instantaneous angle of the surface at the point of incidence of the beam profile 233 changes along the length, causes a shape to be traced out on the projection surface 101.

In one such an example, the actuator 250 is a linear actuator that causes the beam profiler 260 to move back and forth along the line of actuation. By cycling the beam profiler 260 in full cycles at greater than 24 cycles per second, the shape is traced on the projection surface 101 faster than the refresh rate of the human eye, causing a viewer to see a single drawn shape.

In alternative examples, the actuator 250 may move in a rotary motion, a combination of linear and rotary or other motions.

Further, as with the reflective example of FIG. 2B, the actuation of the beam profiler 272 by the actuator 250 allows the imaging system to be safely functional in harsh environments, or with minimal controls, thereby facilitating its use in emergency warning/notification systems, low maintenance systems, and the like.

Figure 4A:
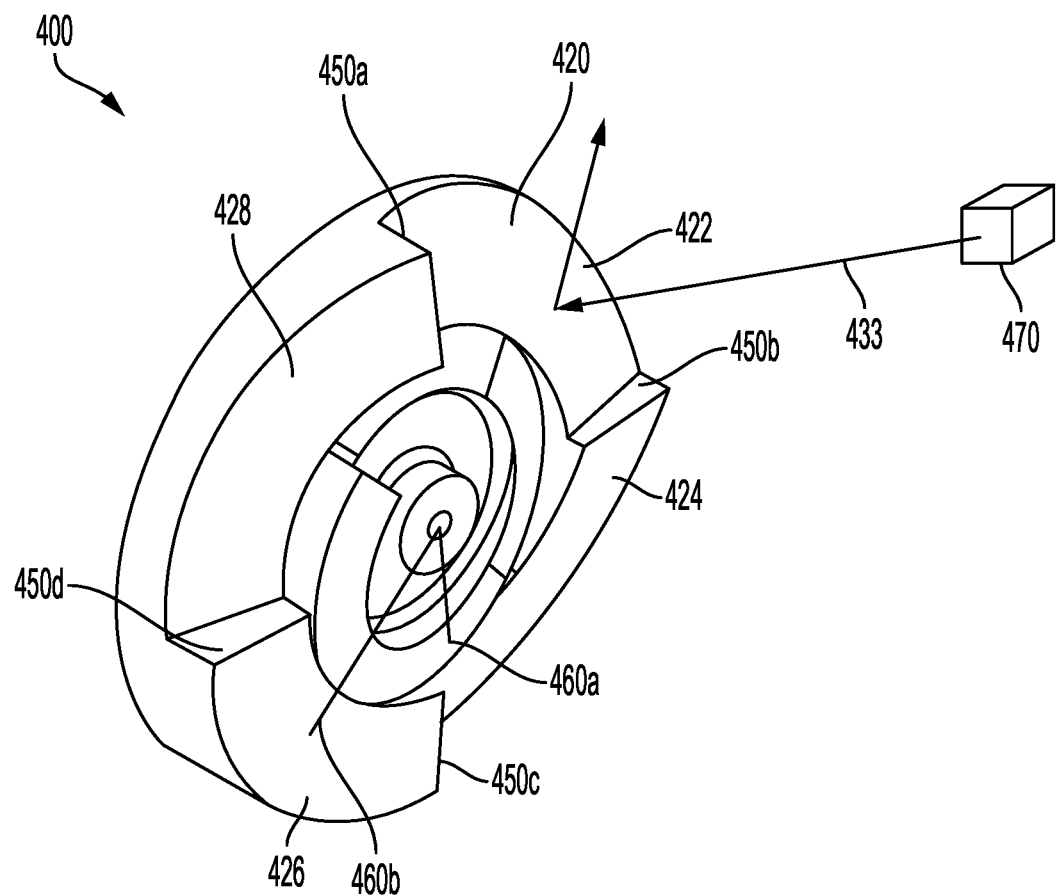
FIG. 4A schematically illustrates an example reflective beam director according to a second embodiment.
Figure 4B:
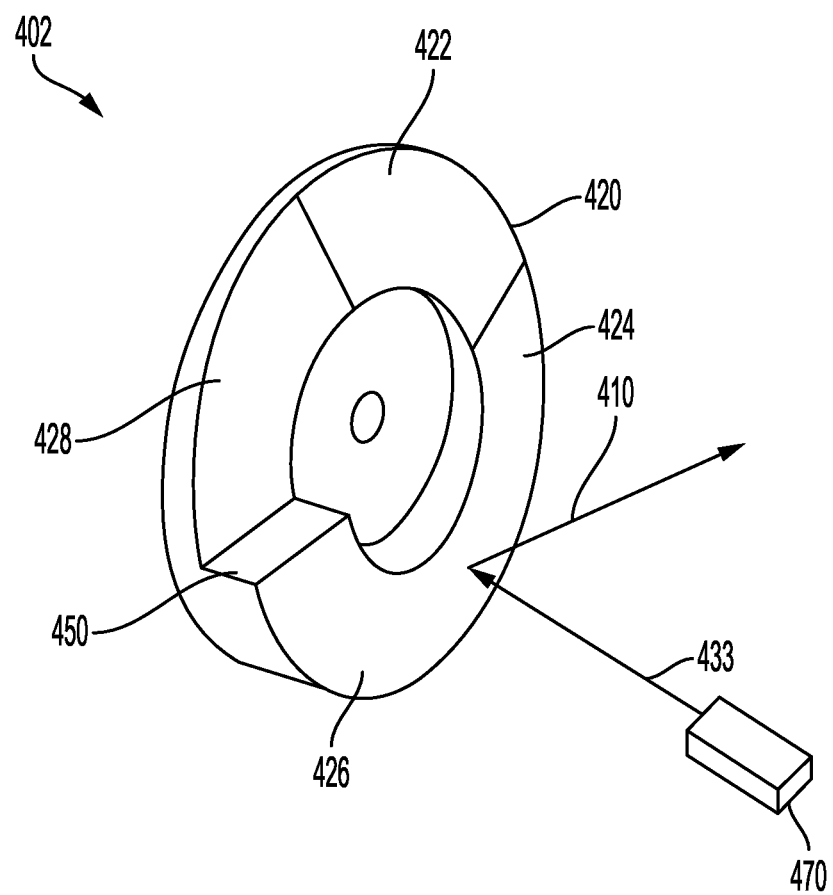
FIG. 4B schematically illustrates an example reflective beam director according to a third embodiment.

FIGS. 4A and 4B schematically illustrate alternative example beam directors 400 and 402, respectively. In each example, the beam director 400, 402 includes a reflecting composite surface 420 having multiple angled facing surface 422, 424, 426, 428. Each of the angled facing surfaces 422, 424, 426, 428 in the example of the beam director 400 of FIG. 4A is connected to an adjacent angled facing surface 422, 424, 426, 428 by a discontinuous surface 450a-d. In contrast, each of the angled facing surfaces 422, 424, 426, 428 in the example beam director 402 of FIG. 4B is connected to at least one adjacent angled surface 422, 424, 426, 428, and only a single discontinuous surface 450 is utilized. The angle of the reflecting composite surface 420 at the point struck by the beam profile 433 changes at the points of incidence on the beam director 400. This change causes the altered beam path to change its path in three-dimensional space. Each of the angled facing surfaces 422, 424, 426, 428 includes one or more angles, relative to the beam profile 433, with the angle of the reflecting composite surface 420 at any given radial position determining the angle in three-dimensional space by which the beam profile 433 is altered.

As the angle of the facing surfaces 422, 424, 426, 428 along the incident arc are not constant across the arc length of the facing surface 422, 424, 426, 428 the angle that the beam profile 433 is reflected is changed at the different points of incidence on each beam director 400, 402. This altered reflection angle in turn allows an image to be projected as described above.

Each of the discontinuous surfaces 450 can be non-reflective, diffusive, or can reflect away from the projection surface. In this manner, multiple distinct images, or breaks within a single image, can be encoded on a single beam director. Alternatively, the facing surfaces 422, 424, 426, 428 can form a more complex single image including two or more disjointed image elements. In yet further alternatives, the facing surfaces 422, 424, 426, 428 can be utilized to create a single continuous image.

In some example embodiments, such as the example of FIG. 4A, the specific images are encoded at a given radius 460 a,b on the beam director. In such an example, additional images can be encoded at different radii 460'. During operation an actuator can shift a beam profiler 470 such that the arc along which the beam profile 433 is incident on the beam director 400, 402 is shifted, allowing the beam director 400, 402 to shift between the encoded images as necessary. In alternative examples, mirrors, reflective surfaces, lenses, a change in actuator profile, actuation of the beam director or similar could be utilized to achieve the shifting between encoded images by altering the incident position of the beam profile 433.

In yet further examples, multiple beam directors can be included within the imaging device. In such examples, a controller can transition the imaging device between the beam directors, and multiple images can be stored in the imaging device.

Figure 5A:
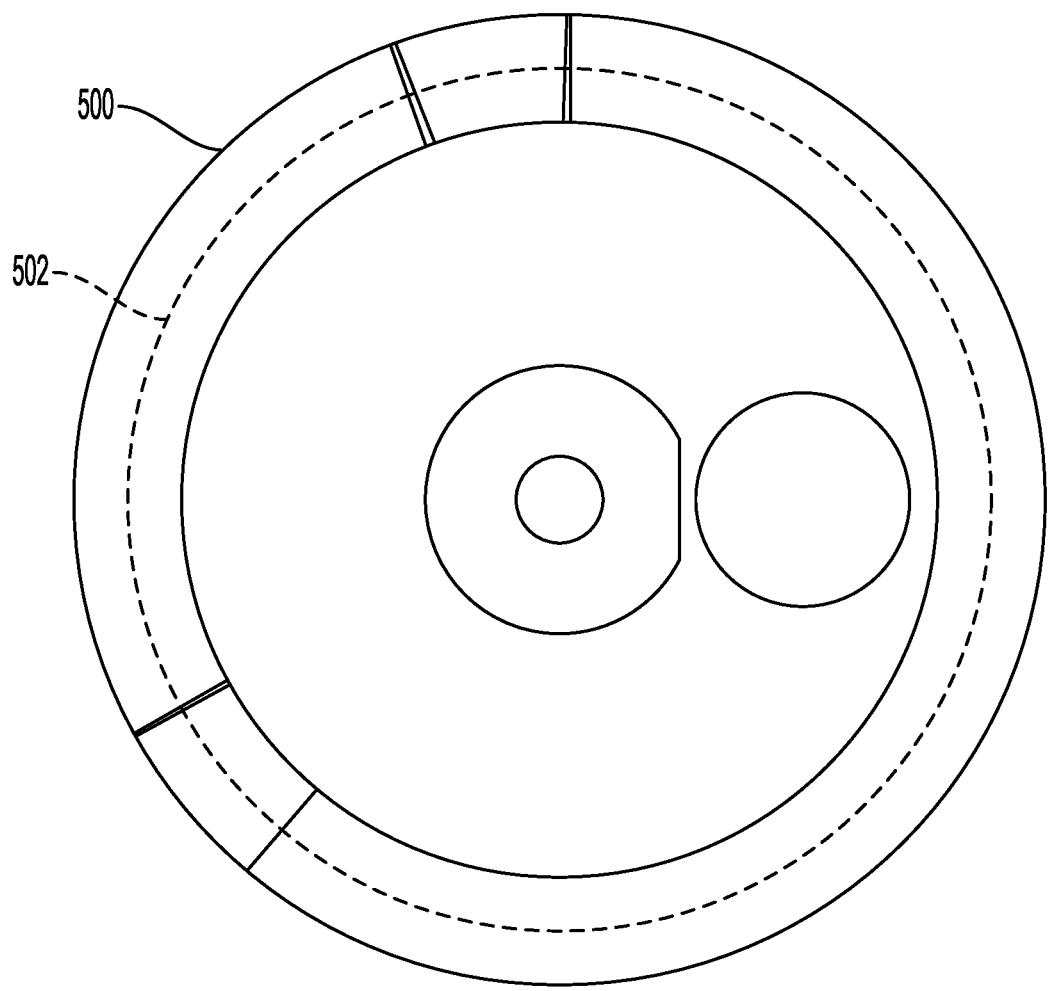
FIG. 5A schematically illustrates an orthogonal front profile incident on a beam director in an example imaging system.
Figure 5B:
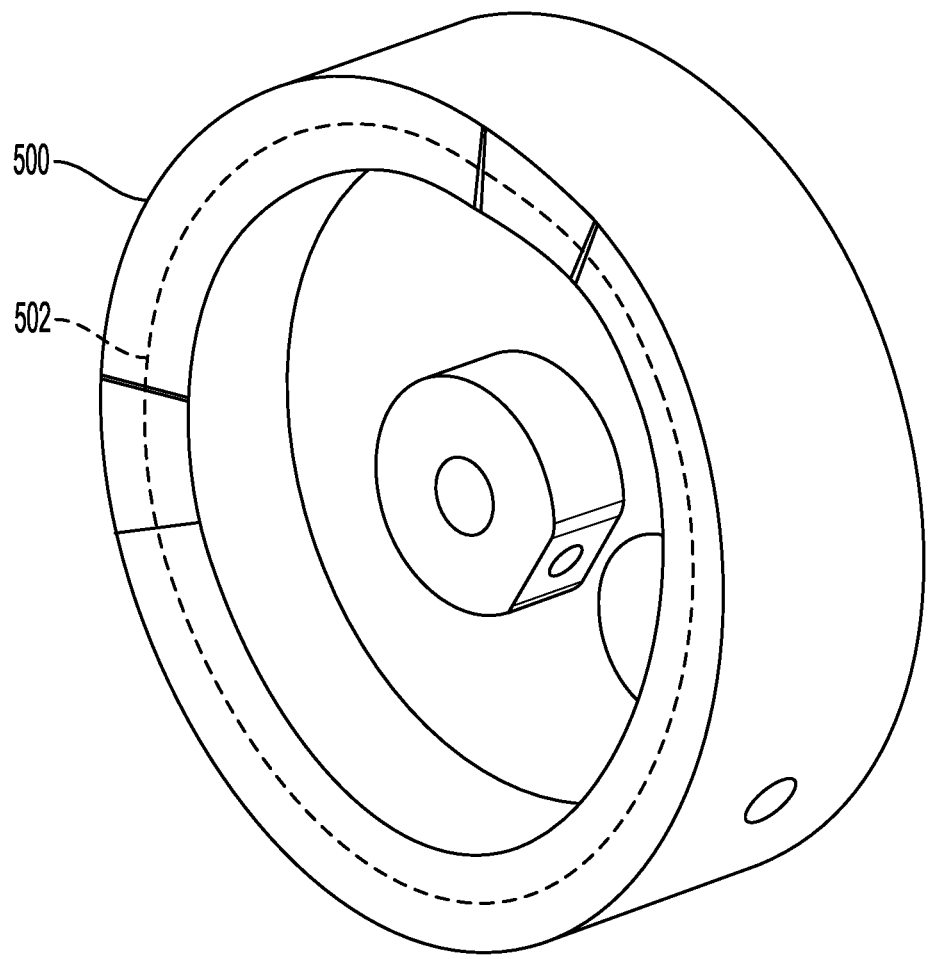
FIG. 5B schematically illustrates an isometric view of the system in FIG. 5A.
Figure 5C:
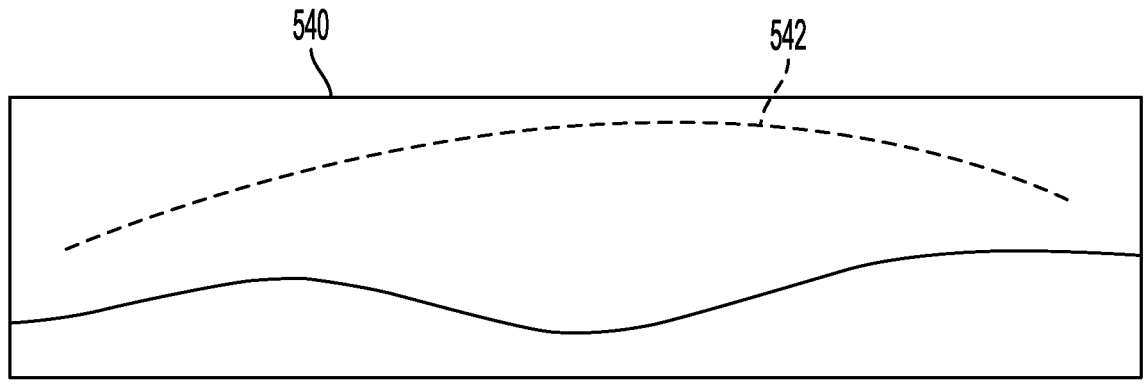
FIG. 5C schematically illustrates an orthogonal front view of an alternate beam profile incident on an alternate beam director in an example imaging system.
Figure 5D:
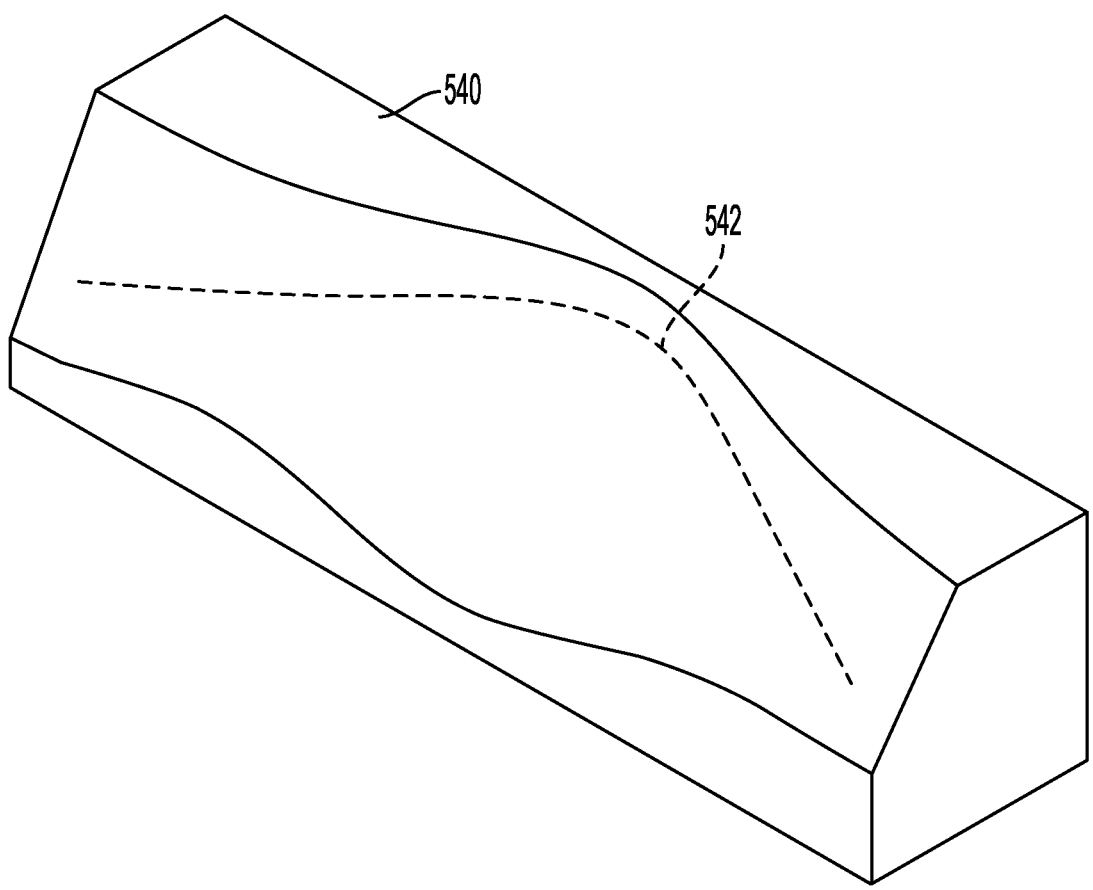
FIG. 5D schematically illustrates an isometric view of the system in FIG. 5A.

FIG. 5A shows an orthogonal front view of a first example beam director 500 with an example incident beam profile 502. FIG. 5B shows an isometric view of the beam director 500. FIG. 5C shows an orthogonal front view of a second example beam director 540 with an example incident beam profile 542. FIG. 5D is an isometric view of the beam director 540. With reference to FIGS. 5A-5D, the beam profile 502, 542 does not contain images or information, that is on the beam director 500, 540. In alternative examples, there can be locations on the beam director 500, 540 to be incident with one or more beam profiles 502, 542 for multiple images or information. In yet further examples, the beam profile 502, 542 may be swept through more than one location of incidence to transition between different images or information.

Figure 6:
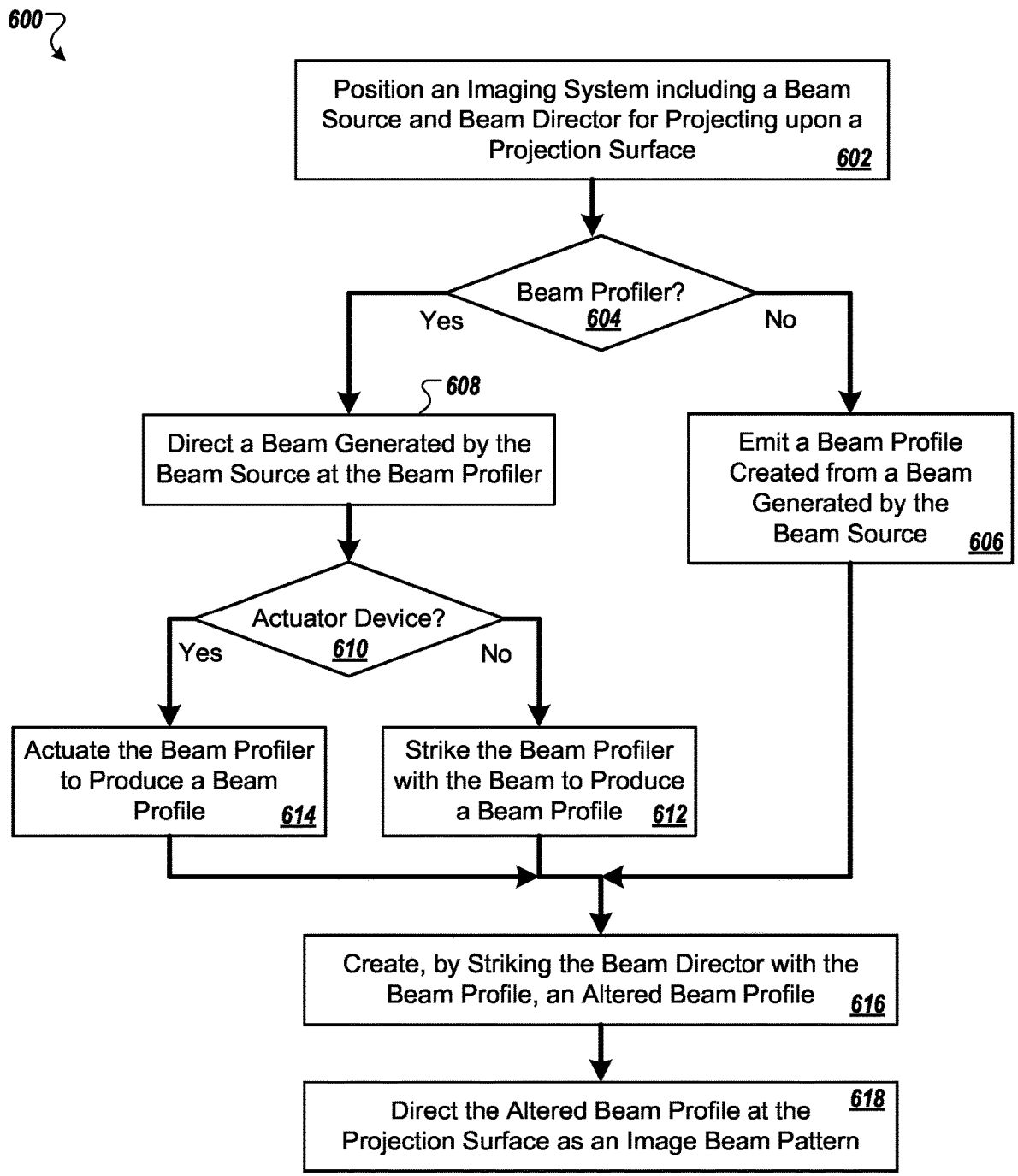
FIG. 6 is a flowchart illustrating an example method for projecting an image.

FIG. 6 illustrates a flowchart describing an example method 600 of projecting an image using any of the above-described imaging devices.

In some implementations, the method begins with positioning an imaging system including a beam source and beam director for projecting upon a projection surface (602). The imaging system, in some examples, may be, or include components from, the imaging system 100 of FIG. 1A, the imaging system 150 of FIG. 1B, the imaging system 200 of FIG. 2A, and/or the imaging system 270 of FIG. 2B.

In some implementations, if the imaging system does not include a beam profiler (604), a beam profile created from a beam generated by the beam source is emitted (606). The beam generated by the beam source may be considered as an initial beam profile. In another example, the beam profile may be redirected from a beam produced by a beam source, such as by mirrors.

In some implementations, if the imaging system includes a beam profiler (604), a beam generated by the beam source is directed at the beam profiler (608). The beam directed at the beam profiler may be considered as an initial beam profile. For example, as illustrated in the system 150 of FIG. 1B, the beam 132 (e.g., initial beam profile) is generated by the beam source 130 and directed at the beam profiler 160. Similarly, the beam 132 may be directed at the beam profiler 260, as illustrated in the imaging system 200 of FIG. 2A, or the beam 132 may be directed at the beam profiler 272 of the imaging system 270, as illustrated in FIG. 2B.

In some implementations, if the imaging system does not include an actuator device for the beam profiler (610), the beam strikes the beam profiler to produce a beam profile (612). The beam profiler, as explained above, may create a beam profile by directing a light beam through shaped openings, mirrors, lenses, diffraction gratings, and/or other optical elements that modify, split, and/or otherwise redirect the light beam. As illustrated in FIG. 1B, for example, the beam profiler 160 splits the initial beam profile 132 to produce a beam profile 133 having a set of sub-beams 133a-c.

In some implementations, if the imaging system does have an actuator device (610), the beam profiler is actuated to produce the beam profile (614). As described in relation to the actuator 250 of FIG. 2A and FIG. 2B, for example, the actuator may be a rotary or linear actuator that articulates, causing the beam to trace and/or shift a beam profile.

In some implementations, whether the beam profile is an initial beam profile created from the beam generated by the beam source or the initial beam profile has been adjusted through directing the initial beam profile at a stationary or articulating beam profiler, an altered beam profile is created by striking the beam director with the beam profile (616). The beam profile may be incident on the beam director. The beam director, in some examples, may be the beam director 300 of FIG. 3, the beam director 400 of FIG. 4A, the beam director 402 of FIG. 4B, or the beam director 500 of FIG. 5A and FIG. 5B. As illustrated in FIG. 1A, for example, the initial beam profile 133 strikes the beam director 140. As illustrated in FIG. 1B, the beam profile 133 produced by the beam profiler 160 strikes the beam director 140. Similarly, as illustrated in FIG. 2A, the beam profile 133 produced by the beam profiler 260 strikes the beam director 240. In another example, as illustrated in FIG. 2B, the beam profile 133 produced by the beam profiler 272 strikes the beam director 274.

In some implementations, the altered beam profile produced by the beam director is directed at the projection surface as an image beam pattern (618). As described above, the altered beam profile may produce one or more stationary or moving images. The images, for example, may be produced in part through relative movement between the beam profiler and the beam director, relative movement between the beam profile (e.g., by moving the beam source or an intervening component) and the beam director, and/or relative movement between the image beam pattern and the projection surface (e.g., by moving an intervening component between the beam director and the projection surface). The relative movement, for example, may cyclically trace the one or more images.

In some embodiments, a beam director is geometrically encoded with two or more images, such that relative movement between the beam profile and the beam director switches between images encoded on the beam director. In an illustrative example, a single beam director may be geometrically encoded with two separate images, each encoded in a different region of the beam director. The beam profile may be directed at a first region of the beam director to cause presentation of a first image, and then, via relative movement between the beam profile and the beam director, directed at a second region to cause presentation of a second image. The redirecting may be gradual or abrupt. The beam may be controlled to cycle off between images to separate perception of presentation between the two images. To create the perception, during presentation, of the first image morphing into the second image and vice-versa, the redirection may be gradual while the beam is substantially on (e.g., on or cycling at a rate that allows perception of morphing when viewed by the human eye). The geographic regions may be disposed relative to each other in any orientation (e.g., side-by-side, above and below, contiguous or non-contiguous, etc.).

Although described as a particular set of operations, in other embodiments, the method 600 may be modified. In some implementations, the method 600 may include more or fewer operations. For example, lenses and/or mirrors can be utilized to further alter the path of the beam, the beam profile, and/or the altered beam profile. This can be used, according to known principles, to control the size, location, focus, or keystone of the image on the projection surface. The mirrors and/or lenses can be mechanically actuated in some examples. In such an example, the resultant image projected onto the projection surface will appear to be changing size, location, focus and/or keystone on the surface. In another example, adjustments to the location of the beam source can be utilized to further alter the path of the beam. This can be used, according to known principles, to control the size, location, or keystone of the image on the projection surface. The beam source can be mechanically actuated in some examples. In such an example, the resultant image projected onto the projection surface will appear to be changing size, location or keystone on the surface. Although illustrated for sake of simplicity as a series of operations, in some implementations, certain operations of the method 600 may occur in a different order and/or concurrently. Other modifications to the method 600 are possible.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. An imaging system, comprising:
  a beam source configured to generate a beam; and
  a beam director having a surface region geometrically encoded with at least one image such that, when a beam profile created from the beam generated by the beam source strikes a first portion of the surface region of the beam director, an altered beam profile is created incident to the first portion of the surface region, wherein the beam profile comprises a particular light pattern different than the beam,
  the altered beam profile comprises a light beam pattern configured to present at least a portion of the at least one image, and
  the altered beam profile comprises a predetermined beam spacing, a predetermined beam size, and a predetermined beam shape;
  wherein the beam director is configured to redirect one or more predetermined beam profiles including the altered beam profile, incident across one or more portions of the surface region of the beam director including the first portion, as one or more image beam patterns configured to strike one or more projection surfaces where the at least one image is displayed.

2. The imaging system of claim 1, wherein the at least one image is geometrically encoded using at least one of the following: one or more facets, openings, one or more convex surfaces, one or more concave surfaces, one or more continuous 3D surfaces, one or more non-continuous 3D surfaces, one or more light-scattering surfaces, one or more light-absorbing surfaces, one or more light-reflective surfaces, one or more light-refracting surfaces, and one or more light-diffractive surfaces.

3. The imaging system of claim 1, wherein the beam source is configured to produce the beam profile, wherein the particular light pattern has a predetermined geometry.

4. The imaging system of claim 1, further comprising a beam profiler, wherein the beam profiler is configured to produce the beam profile from the beam directed from the beam source.

5. The imaging system of claim 4, wherein the beam profiler comprises at least one of one or more shaped openings, one or more mirrors, one or more lenses, or one or more diffracting elements.

6. The imaging system of claim 4, further comprising an actuator configured to articulate the beam profiler, thereby causing controlled redirection of the one or more predetermined beam profiles off of the one or more portions of the surface region of beam director, wherein
  the actuator articulates the beam profiler to cause repeated tracing of one or more images of the at least one image.

7. The imaging system of claim 6, wherein the actuator is configured to cause the repeated tracing at a refresh speed faster than a refresh rate of human sight such that an entirety of the one or more images appears visible to a viewer.

8. The imaging system of claim 6, wherein the actuator is configured to cause the repeated tracing of a plurality of images of the at least one image to create an effect of a moving image.

9. The imaging system of claim 4, further comprising at least one profile redirection component disposed between the beam profiler and the beam director, wherein the profile redirection component includes at least one of a mirror and a lens.

10. The imaging system of claim 9, wherein the profile redirection component is configured to be articulated relative to the beam director.

11. The imaging system of claim 9, wherein the profile redirection component is configured to modify at least one of a direction, a size, a keystone, or an orientation of the beam profile.

12. The imaging system of claim 1, further comprising a beam redirection component disposed between the beam source and the beam director, wherein the beam redirection component includes at least one of a mirror or a lens configured to alter a path of the beam.

13. The imaging system of claim 12, wherein the beam redirection component is configured to be articulated relative to the beam director.

14. The imaging system of claim 12, wherein the beam redirection component is configured to modify at least one of a direction, a size, a keystone, or an orientation of the beam.

15. The imaging system of claim 1, further comprising at least one image redirection component disposed in a path of at least a first image beam pattern of the one or more image beam patterns, wherein the image redirection component includes at least one of a mirror and a lens.

16. The imaging system of claim 15, wherein the image redirection component is configured to be articulated relative to the beam director.

17. The imaging system of claim 15, wherein the image redirection component is configured to modify at least one of a direction, a size, a keystone, or an orientation of the at least the first image beam pattern.

18. The imaging system of claim 1, wherein the beam source is configured to project the beam of light onto the beam director.

19. A method for projecting an image upon at least one projection surface, the method comprising:
    providing an imaging device comprising
        a beam source, and
        a beam director having a surface region geometrically encoded with at least one image;
    positioning the imaging device for projecting at least one image upon the at least one projection surface;
    generating a beam with the beam source;
    emitting, by the imaging device, a beam profile created from the beam, wherein
        the beam profile comprises a particular light pattern different than the beam, and
        the beam profile is configured to strike a first portion of the surface region of the beam director, thereby producing an altered beam profile comprising a light beam pattern configured to present at least a portion of the at least one image;
    directing at least one image pattern produced by the altered beam profile toward the at least one projection surface such that the at least one image pattern forms a first portion of the at least one image on the at least one projection surface; and
    adjusting at least one of the beam profile or a relative position of the beam profile and the beam director to form a second portion of the at least one image.

20. The method of claim 19, wherein the altered beam profile comprises a predetermined beam spacing, a predetermined beam size, and a predetermined beam shape.

21. The method of claim 19, wherein the at least one image is geometrically encoded on the beam director via a shape and dimensions of at least one surface of the beam director.

22. The method of claim 19, further comprising repeating the emitting, the directing, and the adjusting to repeatedly trace the at least one image on the at least one projection surface.

23. The method of claim 22, further comprising cycling the beam source between an active state and an inactive state while repeatedly tracing the first at least one image.

24. The method of claim 22, wherein the adjusting comprises replacing the beam profile with a second beam profile created from a second beam generated by a second beam source.

25. The method of claim 22, wherein the adjusting comprises directing the beam profile at a second beam director.

26. The method of claim 19, wherein:
    the first portion of the at least one image is a first image geometrically encoded on the beam director in a first region; a second image of the at least one image is geometrically encoded on the beam director in a second region; and
    the adjusting comprises repositioning the beam profile relative to the beam director to form the second image of the at least one image.

* * * * *